United States Patent [19]

Wittlinger

[11] Patent Number: 4,694,737
[45] Date of Patent: Sep. 22, 1987

[54] COFFEE PERCOLATOR

[75] Inventor: Gerhard Wittlinger, Geislingen/Steige, Fed. Rep. of Germany

[73] Assignee: Wuerttembergische Metallwarenfabrik AG, Fed. Rep. of Germany

[21] Appl. No.: 808,832

[22] Filed: Dec. 13, 1985

[51] Int. Cl.⁴ .............................................. A47J 31/06
[52] U.S. Cl. ................................... 99/279; 99/289 R; 210/499
[58] Field of Search ...................... 99/279, 289 R, 306, 99/307, 308, 310, 311, 312, 314, 315, 313; 210/499, 481

[56] References Cited

U.S. PATENT DOCUMENTS 3,288,049 11/1966 Schmid ............................. 99/289 R
3,333,964 8/1967 Bender ................................. 99/311
3,683,790 8/1972 Black ..................................... 99/289

FOREIGN PATENT DOCUMENTS 200855 6/1983 German Democratic Rep. ..................................... 210/499

Primary Examiner—Robert W. Jenkins
Attorney, Agent, or Firm—Arnold, White & Durkee

[57] ABSTRACT

Described is a coffee percolator of the type having a scalding chamber and a coffee filter, a wall of said coffee filter substantially closing said scalding chamber at its lower portion. The wall extends from an upper peripheral rim in a conical configuration with an angle of about 8° to 35° to the horizontal towards a substantially centrally located outlet and comprises a support sieve and a sheet of stainless steel disposed on the upper side of the support sieve facing towards the scalding chamber. The sheet has a thickness of about 20 to 80 µm and is provided with a pattern of etched micro-perforations having a diameter of about 30 to 100 µm at the surface facing towards the scalding chamber. The support sieve has a thickness of about 0.5 to 3 mm and is formed with a pattern of holes having a diameter of about 1 to 5 mm.

7 Claims, 6 Drawing Figures

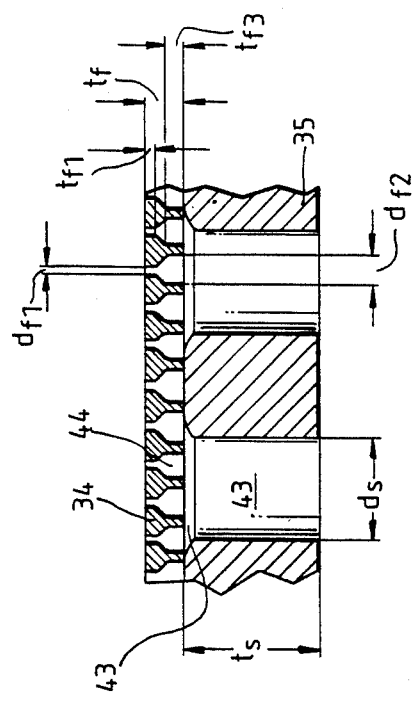
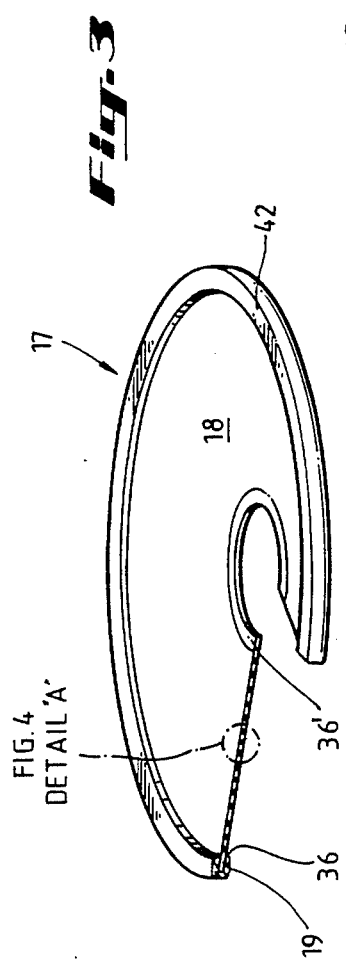
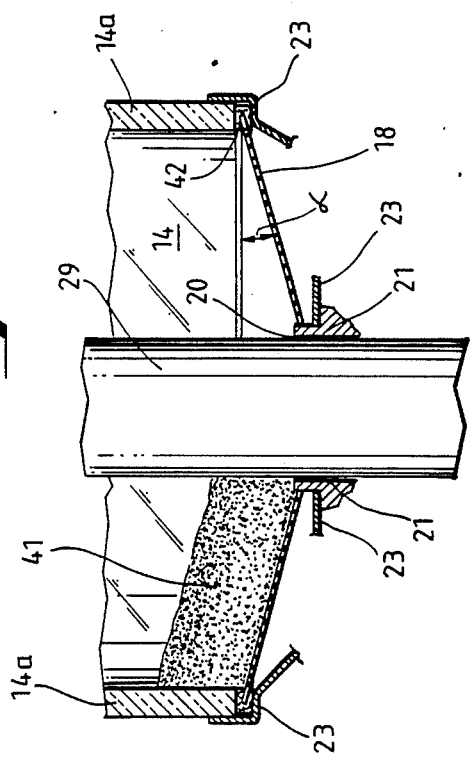

COFFEE PERCOLATOR

The present invention relates to a coffee percolator having a scalding chamber and a filter disposed below the scalding chamber.

BACKGROUND OF THE INVENTION

Coffee percolators of this type are for the most part used in the catering trade or canteens, although their use is not restricted thereto. They operate on the principle that the ground coffee is first supplied to the scalding chamber and poured onto the filter. Subsequently the scalding chamber is supplied with hot water impinging on the coffee meal layer therein and percolating therethrough to thereby extract the flavouring and other soluble substances from the ground coffee. The thus obtained coffee passes through the filter to be received in suitably positioned receptacles such as cups, dippers or reservoirs. After the coffee volume corresponding to the supplied amount of coffee meal has thus percolated, the hot water supply is discontinued, and the exhausted coffee-grounds are removed from the filter.

Subsequently fresh coffee meal is supplied in preparation of a further brewing operation. In a coffee percolator operating by this method, the employ of conventional filter papers or fabrics would be extremely troublesome and might lead to problems with regard to cleaning of the filter.

Known from DE-OS No. 21 32 596 is a coffee filter operating without the conventional filter paper. The coffee filter is of cup-shaped configuration, with both its flat bottom and its sidewall being formed of a metal sheet sieve with micro-perforations. The metal sheet sieve is formed as an integral component by a galvanoplastic process, i.e. by the deposition of a material from an electrolyte bath. The filter is secured to the bottom side of a hot water container by a bayonet coupling. The hot water container has a passage opening directly into the filter. In operation, the filter and hot water container are simply placed on a conventional coffee jug. After the proper amount of water has percolated through the filter, the latter has to be removed for manually cleaning it from the coffee-grounds in a flow of running water. The known filter is unsuitable for use in a coffee percolator having scalding chambers as employed for instance in the catering trade, because the introduction of the coffee meal and the removal of the coffee-grounds are rather troublesome operations. It is further known that coffee has rather corrosive properties. For this reason, and for reasons of hygiene, coffee should only be brought into contact with indifferent materials having corrosion-resilient properties with respect to coffee, such as glass, ceramics, certain synthetics, and stainless steel. None of these materials, however, are capable of being deposited by a galvanoplastic process. On the other hand, the formation of micro-perforations or slots is not feasible by mechanical processing such as drilling or cutting. Since in a coffee percolator having a scalding chamber the coffee is prepared at an elevated pressure, it is further required that the coffee filter have sufficient stability.

SUMMARY OF THE INVENTION

It is therefore an object of the invention to provide a coffee percolator having a filter operating without the aid of filter paper or fabric or similar inlay materials.

It is a further object of the invention to provide a coffee percolator having a pressurized scalding chamber with a stable filter.

A still further object of the invention is the provision of an improved filter for a coffee percolator having a scalding chamber.

It is still another object of the invention to provide a coffee percolator having a filter which is readily cleaned while still permitting optimum utilization of the coffee meal.

A still further object of the invention is the provision of a coffee percolator having a filter formed with micro-perforations and consisting of a corrosion-resistant and hygienically unobjectionable material.

It is finally an object of the invention to provide a coffee percolator including a filter capable of being manufactured in a simple manner.

Further objects of the invention will become evident from the following description with reference to the accompanying drawings.

BRIEF DESCRIPTION OF THE DRAWINGS

An embodiment of the invention shall now be described by way of example with reference to the accompanying drawings, wherein:

FIG. 2 shows an enlarged and partially sectioned view of the installation of the filter of FIG. 1, FIG. 3 shows a perspective and partially sectioned view of the filter of FIG. 1, FIG. 4 shows a detail A from FIG. 3.

DESCRIPTION OF THE PREFERRED EMBODIMENTS

Figure 1:
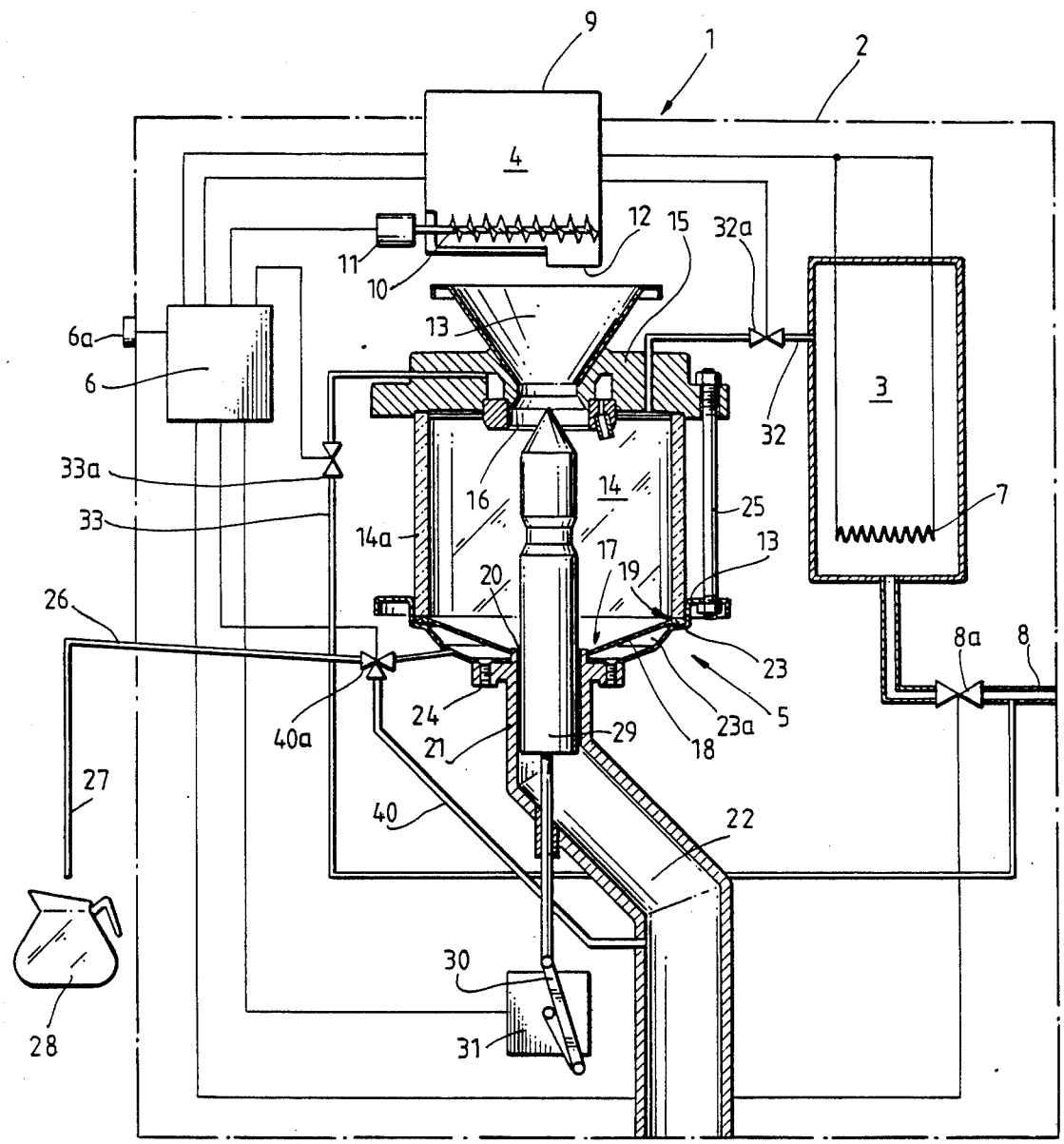
FIG. 1 shows a diagrammatical representation of a coffee percolator having a filter.

Shown in FIG. 1 is a diagrammatical representation of a coffee percolator as may for instance be employed in connection with the present invention, it being noted, however, that the invention is not restricted to the employ in the coffee percolator shown.

The coffee percolator is generally indicated at 1 and has a housing 2 diagrammatically indicated by dash-dot lines. Housing 2 contains a hot water container 3, a coffee meal reservoir 4, a brewing section 5, and a control unit 6 adapted to be operated through a manual switch 6a, brewing section 5 being depicted in the drawing on an exaggerated scale for better understanding. Disposed in hot water container 3 is a heater 7 for heating cold water supplied via an inlet passage 8 and a valve 8a controlled by control unit 6 to the brewing temperature. Heater 7 is likewise controlled through control unit 6.

Towards the outside of housing 2, coffee meal reservoir 4 is closed by a cover 9 which may be removed for supplying reservoir 4 with coffee meal. Disposed within reservoir 4 is a screw conveyor 10 adapted to be driven by a motor 11 under the control of control unit 6. At the lowermost position of reservoir 4 there is provided a discharge opening 12 located above an intake funnel 13 of brewing section 5.

Brewing section 5 comprises a scalding chamber 14 having generally cylindrical sidewalls 14a and being covered on top by a cover 15 formed with a centrally located filler opening 16 communicating with intake funnel 13. Provided below scalding chamber 14 so as to close the lower portion thereof is a coffee filter 17 having a perforate wall 18 of conical configuration with an upper peripheral rim 19 and a centrally located outlet opening 20. Coffee filter 17 is supported in such a manner that its upper peripheral rim 19 is in contact with sidewalls 14a of scalding chamber 14 and its outlet opening 20 opens into a sleeve 21 forming part of a coffee-grounds discharge conduit 22. Sleeve 21 is secured to a bottom member 23 by means of screws 24. Bottom member 23 is disposed at a spaced location below coffee filter 17 and connected to cover 15 by tension bolts 25. The thus formed collecting space 23a between bottom member 23 and coffee filter wall 18 has a pipe conduit 26 connecting it to a coffee dispensing tube 27 located outside of housing 2. A suitable receptacle, shown in the drawing as a jug 28, may be placed below dispensing tube 27 for receiving the percolated coffee beverage.

Inserted in pipe conduit 26 is a valve 40a controlled by control unit 6 for opening and closing a branch conduit 40 connecting pipe conduit 26, and thus collecting space 23a, to discharge conduit 22.

Filler opening 16 of cover 15, outlet opening 20 of coffee filter 17 and sleeve 21 are disposed in coaxial alignment, their diameters being dimensioned so as to permit a control piston 29 to be slidably guided therein. Control piston 29 is adapted to be displaced to various control positions by the action of a gear mechanism 30 driven by a motor 31 under the control of control unit 6.

In the position of control piston 29 shown in FIG. 1, a metering rotation of screw conveyor 10 will be effective to transfer coffee meal from reservoir 4 through outlet opening 12 into intake funnel 13, and from there through filler opening 16 into scalding chamber 14. The thus transferred coffe meal will be deposited on the surface of wall 18 of coffee filter 17 facing towards scalding chamber 14 to preferably result in a coffee meal layer of substantially uniform thickness over the entire surface of wall 18. After the metered amount of coffee meal has been thus transferred, control piston 29 is displaced upwards to a position in which it closes filler opening 16 and sleeve 21. Control unit 6 subsequently opens a valve 32a in a scalding water supply pipe 32 for admitting hot water from hot water container 3 to scalding chamber 14 through cover 15 and an annular distribution system not shown in detail and including a nozzle arrangement. In scalding chamber 14, the hot water impinges on the coffee meal supported on coffee filter 17 and percolates therethrough to extract the soluble components therefrom. The resulting coffee beverage passes through perforate wall 18 of coffee filter 17 into collecting space 23a above bottom member 23, from where it flows through pipe conduit 26 and dispensing tube 27 into receptacle 28, while valve 40a is effective to keep branch conduit 40 closed. After termination of this brewing process, control piston 29 is displaced to a position in which filler opening 16 is closed, while outlet opening 20 and sleeve 21 are opened. Conrol unit 6 then causes a valve 33a of a cleaning conduit 33 branching off from cold water supply conduit 8 to be opened. As a result, cleaning water is admitted to the interior of scalding chamber through likewise not detailedly shown distributor means and nozzles to rinse the coffee-grounds off wall 18 and through outlet opening 20, sleeve 21 and discharge conduit 22 to a location outside of housing 2, for instance a residues receptacle. During this operation, valve 40a is operated to keep pipe conduit 26 towards dispensing tube 27 closed and to open branch conduit 40, so that the cleaning water passing through coffee filter 17 and any coffee meal particles possibly entrained therein also flows from collecting space 23a into discharge conduit 22. Subsequently valve 40a remains in this position until manual switch 6a is actuated to initiate a further brewing cycle, so that any water leaking in the meantime is prevented from flowing towards dispensing tube 27.

With regard to the cleaning operation it is important that the exhausted coffee-grounds are removed from the coffee filter 17 as quickly and as thoroughly as possible, so that a further coffee-making cycle may be initiated.

The coffee filter is shown more clearly in FIGS. 2 to 4. Coffee filter 17 is of annular configuration, its wall 18 converging at an angle $\alpha$ from upper peripheral rim 19 towards outlet opening 20. The angle $\alpha$ is of 8° to 35°. It has been found that a convergence under this angle on the one hand does not prevent the coffee meal 41 from being deposited in a layer of uniform thickness, because the friction of the coffee meal 41 is not yet overcome by gravity. On the other hand, the angle is sufficient for permitting the exhausted coffee-grounds to be rapidly flushed from the filter.

FIG. 2 shows a sectional view of the lower portion of scalding chamber 14, with control piston 29, sleeve 21 and bottom member 23 being only partially shown. Upper peripheral rim 19 of coffee filter 17 is provided with a seal 42 and clamped between sidewalls 14a of scalding chamber 14 and bottom member 23 in the manner already described. The edge of outlet opening 20 of coffee filter 17 rests on bottom portion 23, the latter being retained by sleeve 21.

As shown by the sectional view of coffee filter 17 in FIG. 3, and particularly by the enlarged detail A shown in FIG. 4, wall 18 of coffee filter 17 consists of a thin sheet 34 and a supporting sieve 35. Sheet 34 is supported on the side of sieve 35 facing towards scalding chamber 14 so as to completely cover the respective surface thereof. Sheet 34 and support sieve 35 may be connected to one another adjacent peripheral rim 19 by at least one weld 36.

In the embodiment shown, weld seam 36 extends fully around peripheral rim 19; it is also possible, to establish the connection by point welding or by the use of a crimped sheet metal strip. Also possible is the provision of an interrupted or continuous weld seam 36' around outlet opening 20. It is finally also possible to place the sheet losely onto the supporting sieve to be clamped together therewith between sidewalls 14a and bottom member 23.

Support sieve 35 consists of a conically formed sheet sieve of stainless steel, preferably a Cr-Ni steel. The thickness $t_s$ of the sheet sieve has to be sufficient to withstand the weight of the coffee meal and the pressure of the hot water within scalding chamber 14. To this purpose, a thickness $t_s$ between 0.5 and 3 mm, preferably 0.8 to 1.5 mm, has been found satisfactory. Support sieve 35 is formed, preferably over its entire area, with punched holes 43. The punch burrs should either be removed or located on the side facing away from sheet 34. The punching operation results in a rounding or chamfering of the boundary edges 43a of the holes 43, so that on the one hand sheet 34 is not damaged, and on the other hand the smallest possible number of the micro-perforations 44 of sheet 34 are obstructed, while still ensuring the supporting function of the support sieve 35. The diameters $d_s$ of holes 43 are preferably between 1 and 5 mm, there being preferably about 17 to 25 holes per cm$^2$ in a pattern of holes having a diameter of for instance 2 mm.

Figure 5:
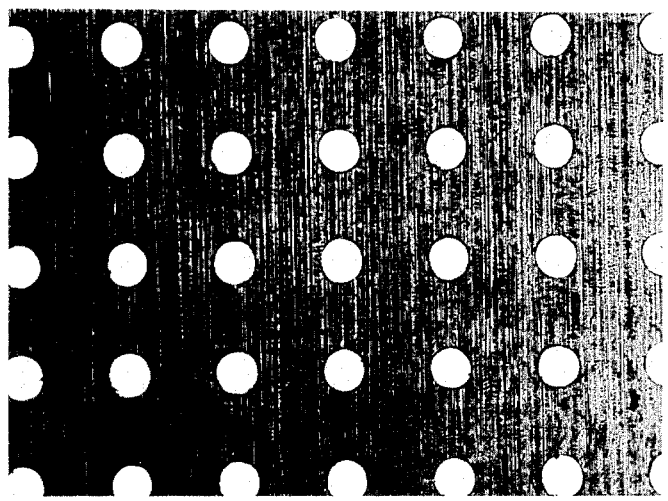
FIG. 5 shows a top plan view of a portion of the filter sheet as enlarged on the scale of 100:1, and FIG. 6 a sectional view of a micro-perforation of the sheet as enlarged on the scale of 500:1 (i.e. a thin ground section).
Figure 6:
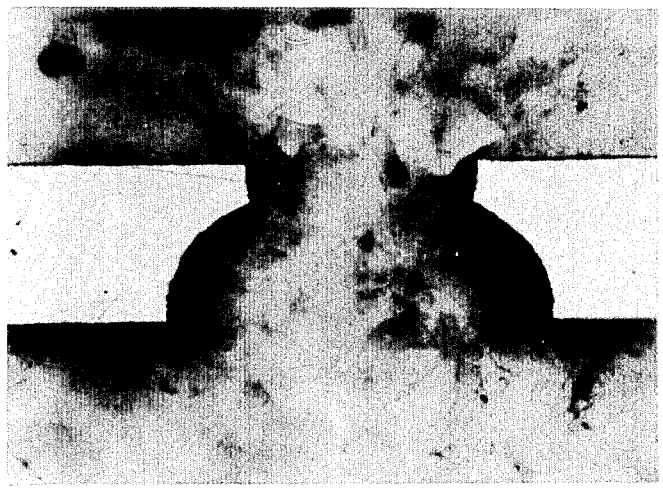

Sheet 34 likewise consists of a stainless steel, preferably a Cr-Ni steel. The thickness of sheet 34 is about $t_f=20$ to 20 μm. As shown in FIG. 5, sheet 34 has a pattern of uniformly distributed micro-perforations at spacings of about 0.15 to 5 mm, preferably 0.167 mm, and with diameters $d_{f1}$ of about 30 to 100 μm at the side of sheet 34 facing away from support sieve 35 and towards scalding chamber 14. The diameter $d_{f2}$ of the micro-perforations at the side of the sheet 34 facing towards the support sieve 35 and away from scalding chamber 14 is somewhat larger, as shown in FIG. 6, and amounts to about 1.2 to 2 times the smaller diameter $d_{f1}$. The diameter of the micro-perforations does not increase gradually, but results in a goblet configuration, wherein the diameter $d_{f1}$ initially remains constant or increases only slightly in a first thickness range $t_{f1}$, and undergoes a disproportional increase only at a certain depth ($t_{f2}$), the thickness range $t_{f1}$ extending over about one-third of the thickness t of sheet 34. The upper boundaries of the micro-perforations facing towards scalding chamber 14 are substantially sharp-edged, with their rounding-off preferably not exceeding 15% of the diameter $d_{f1}$ of the micro-perforations. This configuration is advantageous in that it substantially prevents coffe meal particles from becoming jammed in the micro-perforations. If any coffee meal particles get stuck within the narrow portion $t_{f1}$, they can be readily removed by the flushing operation. If the coffee meal particles are forced into the sheet to a greater depth, they are released therefrom on entering the enlarged diameter portion $t_{f2}$ so as to drop down through the holes of the support sieve.

In place of micro-perforations of substantially circular shape as described above, it is readily possible to provide perforations of rectangular, oval or rounded elongate shapes, as long as the width of the perforations lies between 30 and 90 μm and the cross-sectional shape of the perforations is similar to the one described above. In the example described and depicted in the drawings, substantially the entire area of the sheet is formed with micro-perforations at a substantially uniform pattern as shown in FIG. 5. It is also possible, however, to provide the micro-perforations only in certain areas of sheet 34, it being sufficient to provide the micro-perforations on about 25% of the entire area of sheet 34. In this case, the areas provided with micro-perforations are preferably distributed in a uniform pattern over the total area of sheet 34. The diameter of the micro-perforations, their configuration and their spacing within the perforate areas correspond to the values set forth above.

The micro-perforations of sheet 34 are formed by a per se known prior art chemical etching process currently employed for instance in the production of shear leaves of dry shavers or shadow masks for colour image tubes. In a process of this type, both sides of the sheet are provided with a covering layer, the covering layer on one side being formed with perforations corresponding to the desired number of perforations, their diameters, their shapes and the perforation pattern. The sheet is then etched through by spraying an etching solution onto one of its sides. Employed is an etching solution consisting of a ferro-III-chloride solution (460 g/liter) at 50° C. The etching rate is 20 μm per minute. During the etching process, care has to be taken that the otherwise undesirable undercut etching phenomenon takes place below the covering layer, although in a controlled manner, so as to result in the desired goblet-shaped cross-sectional configuration.

The scope of the invention is obviously not restricted to the embodiments described by way of example and depicted in the drawings, there being numerous modifications thereof imaginable within the purview of the claims.

I claim:

1. A coffee percolator comprising a scalding chamber and a coffee filter including a wall substantially closing said scalding chamber at its lower portion and extending from an upper peripheral rim in a conical configuration with an angle of about 8° to 35° to the horizontal towards a substantially centrally located outlet, said wall comprising a support sieve and a sheet of stainless steel disposed on the upper surface of said support sieve facing towards said scalding chamber, said sheet having a thickness of about 20 to 80 μm and being provided with a pattern of etched micro-perforations having a diameter of about 30 to 100 μm at the surface facing towards said scalding chamber and wherein the diameter of substantially all of said micro-perforations of said sheet increases from the upper side thereof facing towards said scalding chamber in the direction of the lower side facing towards said support sieve, said support sieve having a thickness of about 0.5 to 3 mm and being provided with a pattern of holes having a diameter of about 1 to 5 mm.

2. A coffee percolator according to claim 1, wherein substantially all of the micro-perforations of said sheet are of a goblet-shaped cross-sectional configuration.

3. A coffee percolator according to claim 2, wherein a portion comprising the smaller diameter extends over about one-third of the thickness of said sheet.

4. A coffee percolator according to any of claims 2 or 3, wherein the openings of said micro-perforations facing towards said scalding chamber are substantially sharp-edged, any chamfers of roundings of said micro-perforations being less than 15% of the smallest micro-perforation diamter.

5. A coffee percolator comprising a scalding chamber and a coffee filter having a wall extending from an upper peripheral edge in a conical configuration with an angle of about 8° to 35° to the horizontal towards a substantially centrally located outlet, said wall comprising a support sieve and a sheet of stainless steel supported on the upper side of said support sieve facing towards said scalding chamber, said sheet having a thickness of about 20 to 80 μm and being provided with a pattern of etched micro-perforations of elongate shape having a smaller and a larger width as measured at an angle of 90° relative to one another, said smaller width being 30 to 100 μm at the surface facing towards said scalding chamber, said support sieve having a thickness of about 0.5 to 3 mm and a pattern of holes having a diameter or width of 1 to 5 mm.

6. A coffee percolator having a scalding chamber and a coffee filter including a wall substantially closing said scalding chamber at its lower portion and extending from an upper peripheral rim in a conical configuration at an angle of about 8° to 35° to the horizontal towards a substantially centrally located outlet, said wall comprising a support sieve and a sheet of stainless steel welded to the upper side of said support sieve facing towards said scalding chamber adjacent said peripheral rim, said sheet having a thickness of about 20 to 80 μm and being provided with a pattern of micro-perforations having a diameter of about 30 to 100 μm at the surface facing towards said scalding chamber and wherein the diameter of substantially all of said micro-perforations of said sheet increases from the side facing said scalding chamber to the side facing said support sieve, said support sieve having a thickness of about 0.5 to 3 mm and a pattern of holes having a diameter of about 1 to 5 mm.

7. A filter for a coffee percolator comprising a wall including a support sieve and a sheet of stainless steel disposed on said support sieve, said wall being of substantially annular configuration comprising an upper peripheral edge and a centrally located outlet, said sheet and said support sieve being welded to one another adjacent said peripheral edge, said sheet having a thickness of about 20 to 20 μm and being provided with a pattern of etched micro-perforations having a diameter of about 30 to 100 μm at the surface facing away from said support sieve and wherein the diameter of substantially all of said micro-perforations of said sheet increases from the side facing said scalding chamber to the side facing said support sieve, said support sieve having a thickness of about 0.5 to 3 mm and a pattern of holes having a diameter of about 1 to 5 mm.

* * * * *

UNITED STATES PATENT AND TRADEMARK OFFICE
CERTIFICATE OF CORRECTION

PATENT NO.   : 4,694,737
DATED        : September 22, 1987
INVENTOR(S)  : Gerhard Wittlinger It is certified that error appears in the above-identified patent and that said Letters Patent are hereby corrected as shown below:

Column 8, line 4, "20" in the second instance should be

--80--.

Signed and Sealed this

Eighth Day of December, 1987

Attest:

DONALD J. QUIGG

Attesting Officer          Commissioner of Patents and Trademarks